United States Patent
Chastain et al.

(10) Patent No.: US 10,681,534 B2
(45) Date of Patent: *Jun. 9, 2020

(54) METHODS FOR PROVISIONING UNIVERSAL INTEGRATED CIRCUIT CARDS

(71) Applicants: AT&T Mobility II LLC, Atlanta, GA (US); AT&T INTELLECTUAL PROPERTY I, L.P., Atlanta, GA (US)

(72) Inventors: Walter Cooper Chastain, Atlanta, GA (US); Clifton Ashman Campbell, Norcross, GA (US); Stephen Emille Chin, Marietta, GA (US); David Harber, Cedar Park, TX (US); Brian Keith Rainer, Lawrenceville, GA (US); David K. Smith, Issaquah, WA (US); Shih-Ming Wang, Sammamish, WA (US)

(73) Assignees: AT&T Intellectual Property I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 8 days.

This patent is subject to a terminal disclaimer.

(21) Appl. No.: 15/989,904

(22) Filed: May 25, 2018

(65) Prior Publication Data
US 2018/0279117 A1 Sep. 27, 2018

Related U.S. Application Data

(63) Continuation of application No. 14/521,838, filed on Oct. 23, 2014, now Pat. No. 10,015,665, which is a
(Continued)

(51) Int. Cl.
*H04W 8/22* (2009.01)
*G06F 21/62* (2013.01)
(Continued)

(52) U.S. Cl.
CPC .......... *H04W 8/22* (2013.01); *G06F 21/6227* (2013.01); *G06F 21/77* (2013.01); *H04W 8/205* (2013.01);
(Continued)

(58) Field of Classification Search
CPC ....... H04W 8/22; H04W 8/205; H04W 12/08; H04W 12/00; H04W 12/02; G06F 21/6227; G06F 21/77
See application file for complete search history.

(56) References Cited

U.S. PATENT DOCUMENTS 5,530,757 A   6/1996  Krawczyk
5,742,910 A   4/1998  Gallant et al.
(Continued)

FOREIGN PATENT DOCUMENTS

AU    2010315111 A1   6/2012
CA       2535102 C     5/2011
(Continued)

OTHER PUBLICATIONS

"Reprogrannnnable SIMs: Technology, Evolution and Implications Final Report", Sep. 25, 2012, CSMG (Year: 2012).*
(Continued)

*Primary Examiner* — David Le
(74) *Attorney, Agent, or Firm* — Guntin & Gust, PLC; Ralph Trementozzi

(57) ABSTRACT

A system is described that can perform a method for receiving a request to modify a universal integrated circuit card, generating a package comprising configuration data for modifying the universal integrated circuit card, instructing an over-the-air system to transmit the package encrypting the package with a transport key to generate an encrypted package, and transmitting the encrypted package to a communication device communicatively coupled to the univer-
(Continued)

sal integrated circuit card to provision the universal integrated circuit card. The system can also perform a method of providing a mobile network operator trusted service manager system information relating to the configuration data to enable the mobile network operator trusted service manager system to manage content and memory allocation of the universal integrated circuit card.

20 Claims, 8 Drawing Sheets

Related U.S. Application Data continuation of application No. 13/679,479, filed on Nov. 16, 2012, now Pat. No. 8,898,769.

(51) Int. Cl.
| | | |
|---|---|---|
| *G06F 21/77* | (2013.01) | |
| *H04W 8/20* | (2009.01) | |
| *H04W 12/00* | (2009.01) | |
| *H04W 12/08* | (2009.01) | |
| *H04W 12/02* | (2009.01) | |

(52) U.S. Cl.
CPC ....... *H04W 12/0023* (2019.01); *H04W 12/08* (2013.01); *H04W 12/00* (2013.01); *H04W 12/02* (2013.01)

(56) References Cited

U.S. PATENT DOCUMENTS

| | | | |
|---|---|---|---|
| 5,774,544 | A | 6/1998 | Lee et al. |
| 6,005,942 | A | 12/1999 | Chan et al. |
| 6,014,561 | A | 1/2000 | Moelne |
| 6,151,677 | A | 11/2000 | Walter et al. |
| 6,615,038 | B1 | 9/2003 | Moles |
| 6,850,252 | B1 | 2/2005 | Hoffberg |
| 6,892,301 | B1 | 5/2005 | Hansmann et al. |
| 6,922,200 | B1 | 7/2005 | Marques et al. |
| 7,165,173 | B1 | 1/2007 | Herle |
| 7,171,460 | B2 | 1/2007 | Kalavade et al. |
| 7,185,362 | B2 | 2/2007 | Hawkes et al. |
| 7,239,704 | B1 | 7/2007 | Maillard et al. |
| 7,257,844 | B2 | 8/2007 | Woodward et al. |
| 7,269,732 | B2 | 9/2007 | Kilian-Kehr |
| 7,346,586 | B1 | 3/2008 | Walmsley et al. |
| 7,382,881 | B2 | 6/2008 | Uusitalo et al. |
| 7,454,233 | B2 | 11/2008 | Lu et al. |
| 7,472,123 | B2 | 12/2008 | Hamatsu |
| 7,480,907 | B1 | 1/2009 | Marolia et al. |
| 7,486,810 | B1 | 2/2009 | Accapadi et al. |
| 7,499,960 | B2 | 3/2009 | Dageville et al. |
| 7,606,560 | B2 | 10/2009 | Labrou et al. |
| 7,668,315 | B2 | 2/2010 | Quick, Jr. et al. |
| 7,715,823 | B2 | 5/2010 | Bravo et al. |
| 7,751,567 | B2 | 7/2010 | Quick, Jr. et al. |
| 7,882,208 | B2 | 2/2011 | Akashika et al. |
| 7,917,751 | B2 | 3/2011 | Keohane et al. |
| 7,933,591 | B2 | 4/2011 | Blom et al. |
| 7,953,391 | B2 | 5/2011 | Lee et al. |
| 8,027,472 | B2 | 9/2011 | Aissi et al. |
| 8,032,756 | B2 | 10/2011 | Inami |
| 8,037,522 | B2 | 10/2011 | Holtmanns et al. |
| 8,055,910 | B2 | 11/2011 | Kocher et al. |
| 8,064,598 | B2 | 11/2011 | Vaha-Sipila et al. |
| 8,098,818 | B2 | 1/2012 | Grilli et al. |
| 8,165,635 | B2 | 4/2012 | Khan et al. |
| 8,166,524 | B2 | 4/2012 | Sentinelli |
| 8,186,591 | B2 | 5/2012 | Jolivet |
| 8,213,612 | B2 | 7/2012 | Kaabouch et al. |
| 8,244,181 | B2 | 8/2012 | Shuo |
| 8,260,259 | B2 | 9/2012 | Semple et al. |
| 8,271,025 | B2 | 9/2012 | Brisebois et al. |
| 8,307,410 | B2 | 11/2012 | Martin et al. |
| 8,333,321 | B2 | 12/2012 | Gressel et al. |
| 8,335,921 | B2 | 12/2012 | von Behren et al. |
| 8,346,287 | B2 | 1/2013 | King et al. |
| 8,380,171 | B2 | 2/2013 | Link et al. |
| 8,387,119 | B2 | 2/2013 | Patel et al. |
| 8,391,837 | B2 | 3/2013 | Corda |
| 8,406,758 | B2 | 3/2013 | Snijder et al. |
| 8,417,952 | B2 | 4/2013 | Cheng et al. |
| 8,429,708 | B1 | 4/2013 | Tandon |
| 8,452,012 | B2 | 5/2013 | Aissi et al. |
| 8,483,261 | B2 | 7/2013 | Seo et al. |
| 8,494,908 | B2 | 7/2013 | Herwig et al. |
| 8,495,213 | B2 | 7/2013 | Deprun et al. |
| 8,503,376 | B2 | 8/2013 | Cha et al. |
| 8,505,085 | B2 | 8/2013 | Logan et al. |
| 8,510,553 | B2 | 8/2013 | Adrangi et al. |
| 8,510,559 | B2 | 8/2013 | Guccione et al. |
| 8,533,803 | B2 | 9/2013 | Cha et al. |
| 8,543,814 | B2 | 9/2013 | Laitinen et al. |
| 8,554,222 | B2 | 10/2013 | Yang et al. |
| 8,606,319 | B2 | 12/2013 | Ali et al. |
| 8,625,800 | B2 | 1/2014 | Jooste et al. |
| 8,738,898 | B2 | 5/2014 | Herwono et al. |
| 8,756,427 | B2 | 6/2014 | Shah et al. |
| 8,776,189 | B2 | 7/2014 | Jain |
| 8,799,451 | B2 | 8/2014 | Raleigh et al. |
| 8,799,932 | B2 | 8/2014 | Prevost et al. |
| 8,814,051 | B2 | 8/2014 | Millet et al. |
| 8,837,449 | B2 | 9/2014 | Chen et al. |
| 9,106,628 | B2 | 8/2015 | Kolesnikov et al. |
| 9,130,972 | B2 | 9/2015 | Barkan et al. |
| 9,185,089 | B2 | 11/2015 | Khan et al. |
| 9,301,145 | B2 | 3/2016 | Merrien et al. |
| 9,442,833 | B1 | 9/2016 | Johansson et al. |
| 9,521,126 | B2 | 12/2016 | Boelter et al. |
| 9,668,128 | B2 | 5/2017 | Palanigounder et al. |
| 2001/0029581 | A1 | 10/2001 | Knauft et al. |
| 2002/0003892 | A1 | 1/2002 | Iwanaga et al. |
| 2002/0040936 | A1 | 4/2002 | Wentker et al. |
| 2002/0174071 | A1 | 11/2002 | Boudou et al. |
| 2002/0188855 | A1 | 12/2002 | Nakayama et al. |
| 2003/0129965 | A1 | 7/2003 | Siegel |
| 2003/0186722 | A1 | 10/2003 | Weiner |
| 2004/0240671 | A1 | 12/2004 | Hu et al. |
| 2005/0002407 | A1 | 1/2005 | Shaheen et al. |
| 2005/0083947 | A1 | 4/2005 | Vaarala et al. |
| 2005/0120248 | A1 | 6/2005 | Medvinsky et al. |
| 2005/0202803 | A1 | 9/2005 | Mahalal |
| 2005/0259673 | A1 | 11/2005 | Lu et al. |
| 2005/0278787 | A1 | 12/2005 | Naslund et al. |
| 2006/0074550 | A1 | 4/2006 | Freer et al. |
| 2006/0079284 | A1 | 4/2006 | Lu et al. |
| 2006/0085848 | A1 | 4/2006 | Aissi et al. |
| 2006/0101270 | A1 | 5/2006 | Laitinen |
| 2006/0130128 | A1 | 6/2006 | Gorancic et al. |
| 2006/0165060 | A1 | 7/2006 | Dua |
| 2006/0205387 | A1 | 9/2006 | Laitinen et al. |
| 2006/0206710 | A1 | 9/2006 | Gehrmann |
| 2006/0242064 | A1 | 10/2006 | Jogand-Coulomb et al. |
| 2006/0269061 | A1 | 11/2006 | Balasubramanian et al. |
| 2006/0289659 | A1 | 12/2006 | Mizushima et al. |
| 2007/0050365 | A1 | 3/2007 | Laitinen et al. |
| 2007/0101122 | A1 | 5/2007 | Guo |
| 2007/0239857 | A1 | 10/2007 | Mahalal et al. |
| 2007/0294744 | A1 | 12/2007 | Alessio et al. |
| 2007/0299780 | A1 | 12/2007 | Vanska et al. |
| 2008/0005559 | A1 | 1/2008 | Johnson |
| 2008/0010470 | A1 | 1/2008 | McKeon et al. |
| 2008/0016230 | A1 | 1/2008 | Holtmanns et al. |
| 2008/0059804 | A1 | 3/2008 | Shah et al. |
| 2008/0065777 | A1 | 3/2008 | Sherkin et al. |
| 2008/0080399 | A1 | 4/2008 | Wang et al. |
| 2008/0107058 | A1 | 5/2008 | Yang et al. |
| 2008/0127345 | A1 | 5/2008 | Holtmanns et al. |
| 2008/0155257 | A1 | 6/2008 | Werner et al. |
| 2008/0194296 | A1 | 8/2008 | Roundtree et al. |
| 2008/0276090 | A1 | 11/2008 | Merrien et al. |
| 2008/0294891 | A1 | 11/2008 | Ram Ov et al. |

(56) References Cited

U.S. PATENT DOCUMENTS

| | | |
|---|---|---|
| 2008/0301433 A1 | 12/2008 | Vito |
| 2008/0304458 A1 | 12/2008 | Aghvami et al. |
| 2009/0077643 A1 | 3/2009 | Schmidt et al. |
| 2009/0116642 A1 | 5/2009 | Yang |
| 2009/0119506 A1 | 5/2009 | Allen et al. |
| 2009/0163235 A1 | 6/2009 | Michaels et al. |
| 2009/0191846 A1 | 7/2009 | Shi |
| 2009/0191857 A1 | 7/2009 | Horn et al. |
| 2009/0220091 A1 | 9/2009 | Howard |
| 2009/0287922 A1 | 11/2009 | Herwono et al. |
| 2009/0288012 A1 | 11/2009 | Hertel et al. |
| 2009/0291712 A1 | 11/2009 | Park et al. |
| 2009/0313472 A1 | 12/2009 | Guccione et al. |
| 2009/0327138 A1 | 12/2009 | Mardani et al. |
| 2010/0037230 A1 | 2/2010 | Potonniee et al. |
| 2010/0048169 A1 | 2/2010 | Yan et al. |
| 2010/0062808 A1 | 3/2010 | Cha et al. |
| 2010/0159878 A1 | 6/2010 | Kim et al. |
| 2010/0185874 A1 | 7/2010 | Robles et al. |
| 2010/0197350 A1 | 8/2010 | Jeung |
| 2010/0235906 A1 | 9/2010 | Berry |
| 2010/0255819 A1 | 10/2010 | Robles et al. |
| 2010/0281251 A1 | 11/2010 | Arauz Rosado |
| 2010/0287375 A1 | 11/2010 | Lee et al. |
| 2010/0299731 A1 | 11/2010 | Atkinson |
| 2010/0306531 A1 | 12/2010 | Nahari |
| 2010/0315346 A1 | 12/2010 | Lindroos et al. |
| 2011/0003580 A1 | 1/2011 | Belrose et al. |
| 2011/0007899 A1 | 1/2011 | Park et al. |
| 2011/0029779 A1 | 2/2011 | Sekiya et al. |
| 2011/0035584 A1 | 2/2011 | Meyerstein et al. |
| 2011/0087610 A1 | 4/2011 | Batada et al. |
| 2011/0093913 A1 | 4/2011 | Wohlert et al. |
| 2011/0158090 A1 | 6/2011 | Riley et al. |
| 2011/0191597 A1 | 8/2011 | Grall et al. |
| 2011/0208600 A1 | 8/2011 | Aharoni et al. |
| 2011/0211699 A1 | 9/2011 | Ma et al. |
| 2011/0265159 A1 | 10/2011 | Ronda et al. |
| 2011/0269423 A1 | 11/2011 | Schell et al. |
| 2011/0275364 A1 | 11/2011 | Austin et al. |
| 2011/0296182 A1 | 12/2011 | Jia et al. |
| 2011/0296494 A1 | 12/2011 | Muller et al. |
| 2011/0302017 A1 | 12/2011 | Marti et al. |
| 2011/0302408 A1 | 12/2011 | McDermott et al. |
| 2011/0306318 A1 | 12/2011 | Rodgers et al. |
| 2012/0027209 A1 | 2/2012 | Aissi et al. |
| 2012/0028609 A1 | 2/2012 | Hruska |
| 2012/0036042 A1 | 2/2012 | Graylin et al. |
| 2012/0047237 A1 | 2/2012 | Arvidsson et al. |
| 2012/0047563 A1 | 2/2012 | Wheeler et al. |
| 2012/0066504 A1 | 3/2012 | Hird et al. |
| 2012/0072979 A1 | 3/2012 | Cha et al. |
| 2012/0096513 A1 | 4/2012 | Raleigh et al. |
| 2012/0102557 A1 | 4/2012 | Felton et al. |
| 2012/0108205 A1 | 5/2012 | Schell et al. |
| 2012/0108213 A1 | 5/2012 | Kasargod et al. |
| 2012/0130838 A1 | 5/2012 | Koh et al. |
| 2012/0142332 A1 | 6/2012 | Li |
| 2012/0144201 A1 | 6/2012 | Anantha et al. |
| 2012/0159105 A1 | 6/2012 | von Behren et al. |
| 2012/0159163 A1 | 6/2012 | von Behren et al. |
| 2012/0171992 A1 | 7/2012 | Cheong et al. |
| 2012/0172016 A1 | 7/2012 | Veneroso et al. |
| 2012/0172089 A1 | 7/2012 | Bae et al. |
| 2012/0185661 A1 | 7/2012 | Desai et al. |
| 2012/0187184 A1 | 7/2012 | Challa et al. |
| 2012/0190354 A1 | 7/2012 | Merrien et al. |
| 2012/0208597 A1 | 8/2012 | Billman |
| 2012/0226582 A1 | 9/2012 | Hammad |
| 2012/0231844 A1 | 9/2012 | Coppinger et al. |
| 2012/0233685 A1 | 9/2012 | Palanigounder et al. |
| 2012/0246476 A1 | 9/2012 | Zhuang et al. |
| 2012/0259849 A1 | 10/2012 | Deodhar et al. |
| 2012/0266220 A1 | 10/2012 | Brudnicki et al. |
| 2012/0284785 A1 | 11/2012 | Salkintzis et al. |
| 2012/0311563 A1 | 12/2012 | Lee et al. |
| 2012/0317261 A1 | 12/2012 | Ahmavaara et al. |
| 2012/0331292 A1 | 12/2012 | Haggerty et al. |
| 2013/0012168 A1 | 1/2013 | Rajadurai et al. |
| 2013/0023235 A1 | 1/2013 | Fan et al. |
| 2013/0024383 A1 | 1/2013 | Kannappan et al. |
| 2013/0041830 A1 | 2/2013 | Singh et al. |
| 2013/0061303 A1 | 3/2013 | Hart et al. |
| 2013/0067232 A1 | 3/2013 | Cheung et al. |
| 2013/0067552 A1 | 3/2013 | Hawkes et al. |
| 2013/0074163 A1 | 3/2013 | Murakami et al. |
| 2013/0111546 A1 | 5/2013 | Gargiulo et al. |
| 2013/0117824 A1 | 5/2013 | Naslund et al. |
| 2013/0139230 A1 | 5/2013 | Koh et al. |
| 2013/0145455 A1 | 6/2013 | Vijayshankar et al. |
| 2013/0152208 A1 | 6/2013 | King et al. |
| 2013/0166595 A1 | 6/2013 | Meketa et al. |
| 2013/0173759 A1 | 7/2013 | Herse et al. |
| 2013/0203465 A1 | 8/2013 | Ali et al. |
| 2013/0212660 A1 | 8/2013 | Neafsey et al. |
| 2013/0223623 A1 | 8/2013 | Jooste et al. |
| 2013/0262317 A1 | 10/2013 | Collinge et al. |
| 2013/0272714 A1 | 10/2013 | Ohkubo |
| 2013/0273889 A1 | 10/2013 | Lobmaier |
| 2013/0291071 A1 | 10/2013 | Blom et al. |
| 2013/0291084 A1 | 10/2013 | Amiel et al. |
| 2013/0305330 A1 | 11/2013 | Palanigounder |
| 2013/0333015 A1 | 12/2013 | Reynolds et al. |
| 2013/0344857 A1 | 12/2013 | Berionne et al. |
| 2014/0013406 A1 | 1/2014 | Tremlet et al. |
| 2014/0018041 A1 | 1/2014 | Summerer et al. |
| 2014/0040633 A1 | 2/2014 | Leleu |
| 2014/0045462 A1 | 2/2014 | Warnez |
| 2014/0057680 A1 | 2/2014 | Proust et al. |
| 2014/0066019 A1 | 3/2014 | Waters et al. |
| 2014/0073375 A1 | 3/2014 | Li et al. |
| 2014/0101449 A1 | 4/2014 | Trujillo Gonzalez et al. |
| 2014/0189880 A1 | 7/2014 | Funk et al. |
| 2014/0215589 A1 | 7/2014 | Dietrich et al. |
| 2014/0243022 A1 | 8/2014 | L'Heriteau et al. |
| 2014/0281498 A1 | 9/2014 | Bransom et al. |
| 2014/0317686 A1 | 10/2014 | Vetillard et al. |
| 2014/0324698 A1 | 10/2014 | Dolcino et al. |
| 2014/0337234 A1 | 11/2014 | Brewer et al. |
| 2014/0373117 A1 | 12/2014 | Le |
| 2014/0380056 A1 | 12/2014 | Buckley et al. |
| 2015/0017910 A1 | 1/2015 | Li |
| 2015/0106456 A1 | 4/2015 | van Hoek |
| 2015/0249658 A1 | 9/2015 | Lee et al. |
| 2016/0006762 A1 | 1/2016 | Dumoulin et al. |
| 2016/0182512 A1 | 6/2016 | Chastain et al. |
| 2016/0323111 A1 | 11/2016 | Chastain et al. |
| 2016/0323255 A1 | 11/2016 | Chastain et al. |
| 2016/0381555 A1 | 12/2016 | Chastain et al. |
| 2017/0118185 A1 | 4/2017 | Chastain et al. |
| 2017/0180366 A1 | 6/2017 | Chastain et al. |
| 2017/0295158 A1 | 10/2017 | Chastain |
| 2018/0054448 A1 | 2/2018 | Chastain et al. |
| 2018/0145980 A1 | 5/2018 | Chastain et al. |
| 2018/0191715 A1 | 7/2018 | Chastain et al. |
| 2018/0367996 A1 | 12/2018 | Chastain et al. |
| 2019/0007388 A1 | 1/2019 | Chastain et al. |
| 2019/0014129 A1 | 1/2019 | Chastain et al. |
| 2019/0141038 A1 | 5/2019 | Chastain et al. |
| 2019/0312885 A1 | 10/2019 | Chastain et al. |

FOREIGN PATENT DOCUMENTS

| | | |
|---|---|---|
| CA | 2823685 A1 | 2/2012 |
| EP | 1377091 B1 | 12/2005 |
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2074741 A1 | 7/2009 |
| EP | 2113856 A1 | 11/2009 |
| EP | 2210436 A1 | 7/2010 |
| EP | 2223252 A1 | 9/2010 |
| EP | 2461613 A1 | 6/2012 |

(56) References Cited

FOREIGN PATENT DOCUMENTS

| | | |
|---|---|---|
| EP | 2641206 A1 | 9/2013 |
| KR | 2013027097 | 3/2013 |
| WO | 2002063517 | 8/2002 |
| WO | 03046719 A2 | 6/2003 |
| WO | WO2003046719 | 6/2003 |
| WO | 2007079636 A1 | 7/2007 |
| WO | WO2007079636 | 7/2007 |
| WO | 2008059353 A1 | 5/2008 |
| WO | 2008149196 A1 | 12/2008 |
| WO | WO2009/046400 | 4/2009 |
| WO | 2009/126647 | 10/2009 |
| WO | 2010027765 A2 | 3/2010 |
| WO | WO2010051715 | 5/2010 |
| WO | W02011/115407 | 9/2011 |
| WO | 2012065829 A1 | 5/2012 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013098117 A1 | 7/2013 |
| WO | 2013/050296 | 11/2013 |

OTHER PUBLICATIONS

"Mobile/NFC Security Fundamentals Secure Elements 101" Smart Card Alliance Webinar Mar. 28, 2013.
"The Standard for Managing Applications on Secure Chip Technology," Interactive web site http://www.globalplatform.org/ Disclosing standards for GlobalPlatform chips—see tabs on "Specifications" and "Compliance", 1 pg., 2014.
"Over-The-Air Platform Security Review", Mandiant Intelligent Information Security, 6 pgs., Aug. 17, 2010.
"The OTA Platform in the World of LTE", 14 pgs., Jan. 2011.
"3rd Generation Partnership Project; Technical Specification Group Core Network and Terminals; Characteristics of the Universal Subscriber Identity Module (USIM) application", Release 11, 2012.
"3rd Generation Partnership Project; Technical Specification Group Core Network and Terminals; Remote APDU Structure for (U)SIM Toolkit applications", Release 10, 2012.
"3rd Generation Partnership Project; Technical Specification Group Core Network and Terminals; Secured packet structure for (Universal) Subscriber Identity Module (U)SIM Toolkit applications", Release 10, 2012.
"3rd Generation Partnership Project; Technical Specification Group Core Network and Terminals; UICC-terminal interface; Physical and logical characteristics", Release 10, 2011.
"3rd Generation Partnership Project; Technical Specification Group Core Network and Terminals; Universal Subscriber Identity Module (USIM) Application Toolkit (USAT)", Release 11, 2012.
"GlobalPlatform Card Confidential Card Content Management Card Specification v2.2—Amendment A", 2011.
"GlobalPlatform Card Contactless Services Card Specification v2.2—Amendment C", 2012.
"GlobalPlatform Card Remote Application Management over HTTP Card Specification v2.2—Amendment B", 2012.
"GlobalPlatform Card Security Upgrade for Card Content Management Card Specification v 2.2—Amendment E", 2011.
"GlobalPlatform Card Specification", Version 2.2.1, 2011.
"GlobalPlatform Card Technology Secure Channel Protocol 03 Card Specification v 2.2—Amendment D", 2009.
"GlobalPlatform Device Secure Element Remote Application Management", May 2011.
"GlobalPlatform Device Technology Secure Element Access Control", Version 1.0, May 2012.
"GlobalPlatform Device Technology TEE System Architecture", Dec 2011.
"GlobalPlatform Key Management System", Functional Requirements, Nov. 2003.
"GlobalPlatform System Messaging Specification for Management of Mobile-NFC Services", Feb. 2011.
"Reprogrammable SIMs: Technology, Evolution and Implications", csmg, Sep. 25, 2012.
"Reprogrammable SIMs: Technology, Evolution and Implications Final Report", CSMG-Global, Sep. 25, 2012, 1-95.
"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 2011, 1-23.
"Smart Cards; Card Application Tookit (CAT)", Release 11, 2012.
"Smart Cards; ETSI numbering system for telecommunication application providers", Release 11, 2011.
"Smart Cards; Machine to Machine UICC; Physical and logical characteristics", Release 9, 2011.
"Smart Cards; Remote APDU structure for UICC based applications", Release 11, 2012.
"Smart Cards; Secure Channel Between a UICC and an End-Point Terminal (Release 7)", European Telecommunications Standards Institute, May 9, 2018, 5 pages.
"Smart Cards; Secured packet structure for UICC based applications", Release 11, 2012.
"Smart Cards; Security mechanisms for UICC based Applications—Functional requirements", Release 8, 2008.
"Smart Cards; UICC Application Programming Interface (UICC API) for Java Card™", Release 9, 2012.
"Smart Cards; UICC-Terminal Interface; Physical and logical characteristics", Release 10, 2011, 179 pages.
"Universal Mobile Telecommunications System (UMTS); UICC-terminal interface; Physical and logical characteristics", Release 10, 2011.
Barriga, et al., "M2M Remote-Subscription Management," Ericsson Review, ericsson.com, 6 pgs, 2011.
Bernabeu, "Liberty ID-WSF Advanced Client Implementation and Deployment guidelines for SIM/UICC Card environment," Liberty Alliance Project Version 1.0, 18 pgs., 2009.
Chen, , "An efficient end-to-end security mechanism for IP multimedia subsystem", Computer Communications, 2008, vol. 31.18, pp. 4259-4268.
Chun-Ze, , "Study and implementation of UICC security features," Journal of Chongqing University of Posts and Telecommunications (Natural Science Edition) 1 pg., 2006.
Dodson, Ben et al., "Snap2Pass: Consumer-Friendly Challenge-Response Authentication with a Phone", http://prpl.stanford.edu/papers/soups10j.pdf, Apr. 30, 2010.
Edlund, Lasse , "Secure and confidential application on UICC" KTH Computer Science and Communication Master of Science Thesis Stockholm, Sweden, 44 pgs., 2009.
Ericsson, "The OTA Platform in the World of LTE". Giesecke & Devrient, Jan. 2011.
Farhat, Farshid et al., "Private Identification, Authentication and Key Agreement Protocol with Security Mode Setup", Iran Telecommunication Research Center, https://eprint.iacr.org/2011/045.pdf, Apr. 2011, 21 pages.
Global Platform, "Secure Element Remote Application Management", Version 1.0, May 2011.
Huang, et al., "IC activation and user authentication for security-sensitive systems", IEEE 10.1109/HST.2008.4559056, 2008.
Imhontu, et al., "A survey on near field communication in mobile phones & PDAs", Dissertation Halmstad University, 2010. http://hh.diva-portal.org/smash/get/diva2:385433/FULLTEXT01.
Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.
Kounelis, Ioannis et al., "Secure Middleware for Mobile Phones and UICC Applications", Mobile Wireless Middleware, Operating Systems, and Applications, Springer Berlin Heidelberg, 2012, 143-152.
Kounelis, Ioannis et al., "Security of service requests for cloud based m-commerce", MIPRO, 2012 Proceedings of the 35th International Convention, IEEE, 2012.

(56) References Cited

OTHER PUBLICATIONS

Lamotte, Thierry, "IP Smart Cards in the (Not So) Distant Future," ETSI Project Smart Card Platform Meeting Gemplus Research Lab Paper, 18 pgs., Mar. 15, 2001.

Leicher, , "An Identity Provider using a Secure Element of a Phone: Smart Card Based OpenID," 14 pgs., 2012.

Lunde, Lars et al., "Using SIM for strong end-to-end Application Authentication," NTNU Innovation and Creativity, Master of Science in Communication Technology, 170 pgs., May 2006.

Meyerstein, , "Security Aspects of Smart Cards vs. Embedded Security in Machine-to-Machine (M2M) Advanced Mobile Network Applications," Security and Privacy in Mobile Information and Communication Systems Lecture Notes of the Institute for Computer Sciences, Social Info.

Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.

Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.

Nakarmi, Prajwol K. , "Evaluation of VoIP Security for Mobile Devices," KTH Royal Institute of Technology, Master's Thesis, Stockholm, 82 pgs. Jun. 16, 2011.

Nelenkov, , "Using the SIM card as a secure element in Android", http"//nelenkov.blogspot.com/2013/09/using-sim-card-as-secure-element.ntml, 11 pgs., 2013.

Sher, , "Secure service provisioning (SSP) framework for IP multimedia subsystem (IMS)", Technical University of Berlin Doctoral thesis, 225 pgs., Dec. 14, 2007.

Siddiqi, , "Smart Card Packaging Process Control System," KTH Royal Insitute of Technology School of Information and Communication Technology Stockholm, Sweden Masters Thesis, 102 pgs., Aug. 1, 2012.

Zhang, et al., "Cryptographic Key Agreement Protocol Simulation", Semantics Knowledge and Grid (SKG), 2010 Sixth International Conference on, 2010, pp. 418, 419.

\* cited by examiner

METHODS FOR PROVISIONING UNIVERSAL INTEGRATED CIRCUIT CARDS

CROSS-REFERENCE TO RELATED APPLICATION(S)

This application is a continuation of U.S. patent application Ser. No. 14/521,838 filed Oct. 23, 2014, which is a continuation of U.S. patent application Ser. No. 13/679,479 filed Nov. 16, 2012 (now U.S. Pat. No. 8,898,769). All sections of the aforementioned applications are incorporated herein by reference in their entirety.

FIELD OF THE DISCLOSURE

The subject disclosure relates to methods for provisioning universal integrated circuit cards.

BACKGROUND

Mobile Network Operators (MNOs) generally provide each subscriber a communication device with a Universal Integrated Circuit Card (UICC), commonly known as a Subscriber Identity Module or SIM card, which enables the communication device to authenticate and access a mobile network. In some instances the SIM card can be removed by the subscriber and inserted in an alternate communication device, providing the subscriber continuity of network access and services from device to device. A subscriber can switch subscription to another MNO by physically swapping one SIM card for another.

In an environment involving machine-to-machine communications, it is common for a UICC to be placed in harsh environments such as a communication device located in an automobile engine, or atop a streetlight, which is not easily accessible. In such applications the UICC is often embedded in the communication device and not physically replaceable. When a subscriber of a device utilizing an embedded UICC wishes to switch to another MNO, the subscriber may have to replace the device.

BRIEF DESCRIPTION OF THE DRAWINGS

Reference will now be made to the accompanying drawings, which are not necessarily drawn to scale, and wherein.

DETAILED DESCRIPTION

Figure 1:
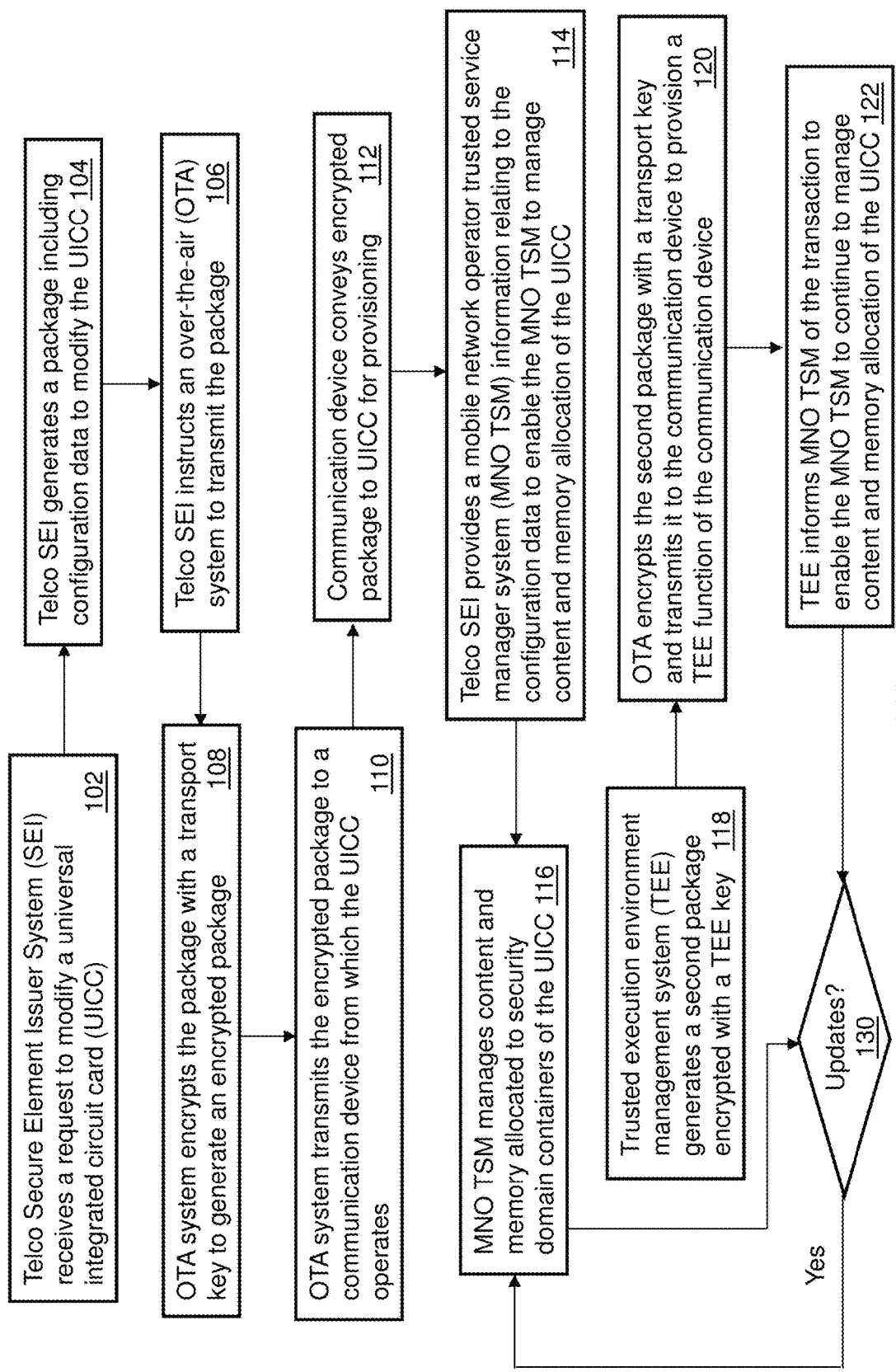
FIG. 1 depicts an illustrative embodiment of a first method.

The subject disclosure describes, among other things, illustrative embodiments for managing content and memory allocated to applications of a universal integrated circuit card (UICC). Other embodiments are included in the subject disclosure.

One embodiment of the subject disclosure includes a method for receiving, by a secure element issuer system, a request to modify a universal integrated circuit card, generating, by the secure element issuer system, a package comprising configuration data for modifying the universal integrated circuit card, and instructing, by the secure element issuer system, an over-the-air system to transmit the package. The method further includes encrypting, by the over-the-air system, the package with a transport key to generate an encrypted package, and transmitting, by the over-the-air system, the encrypted package to a communication device communicatively coupled to the universal integrated circuit card to provision the universal integrated circuit card. The method can also include providing, by the secure element issuer system, a mobile network operator trusted service manager system information relating to the configuration data to enable the mobile network operator trusted service manager system to manage content and memory allocation of the universal integrated circuit card.

One embodiment of the subject disclosure includes a method for receiving, by a mobile wallet trusted service manager system, a request to modify content in a mobile wallet security domain container of a universal integrated circuit card, verifying, by the mobile wallet trusted service manager system, that resources of the universal integrated circuit card and a communication device communicatively coupled to the universal integrated circuit card are capable of satisfying the request, generating, by the mobile wallet trusted service manager system, a script according to the request, encrypting, by the mobile wallet trusted service manager system, the script according to an application key to generate an encrypted script, and instructing, by the mobile wallet trusted service manager system, an over-the-air system to transmit the encrypted script. The method can also include generating, by the an over-the-air system, a package comprising the encrypted script and transport data, encrypting, by the an over-the-air system, the package with a transport key to generate an encrypted package, and transmitting, by the over-the-air system, the encrypted package to the communication device communicatively coupled to the universal integrated circuit card to provision the content of the mobile wallet security domain container of the universal integrated circuit card. The method can further include providing, by the mobile wallet trusted service manager system, a mobile network operator trusted service manager system information relating to the provisioning of the mobile wallet security domain to manage content and memory allocation of the universal integrated circuit card.

One embodiment of the subject disclosure includes a method for receiving, by a subscription management secure routing system of a first service provider, a first encrypted package, wherein the first encrypted package is encrypted by a subscription management data preparation system with an application key responsive to the subscription management data profile system receiving a request from a second service provider to modify a universal integrated circuit card with configuration data, and sending, by the subscription management secure routing system of the first service provider, to an over-the-air system of the first service provider a second package comprising the first encrypted package and transport data. The method can also include encrypting, by the over-the-air system of the first service provider, the second package with a transport key to generate an encrypted second package, and transmitting, by the overthe-air system of the first service provider, the encrypted second package to a communication device communicatively coupled to the universal integrated circuit card to provision the universal integrated circuit card with the configuration data. The method can further include providing, by the subscription management secure routing system of the first service provider, a mobile network operator system of the first service provider information relating to the configuration data to enable the mobile network operator trusted service manager system of the first operator to manage content and memory allocation of the universal integrated circuit card.

Figure 2:
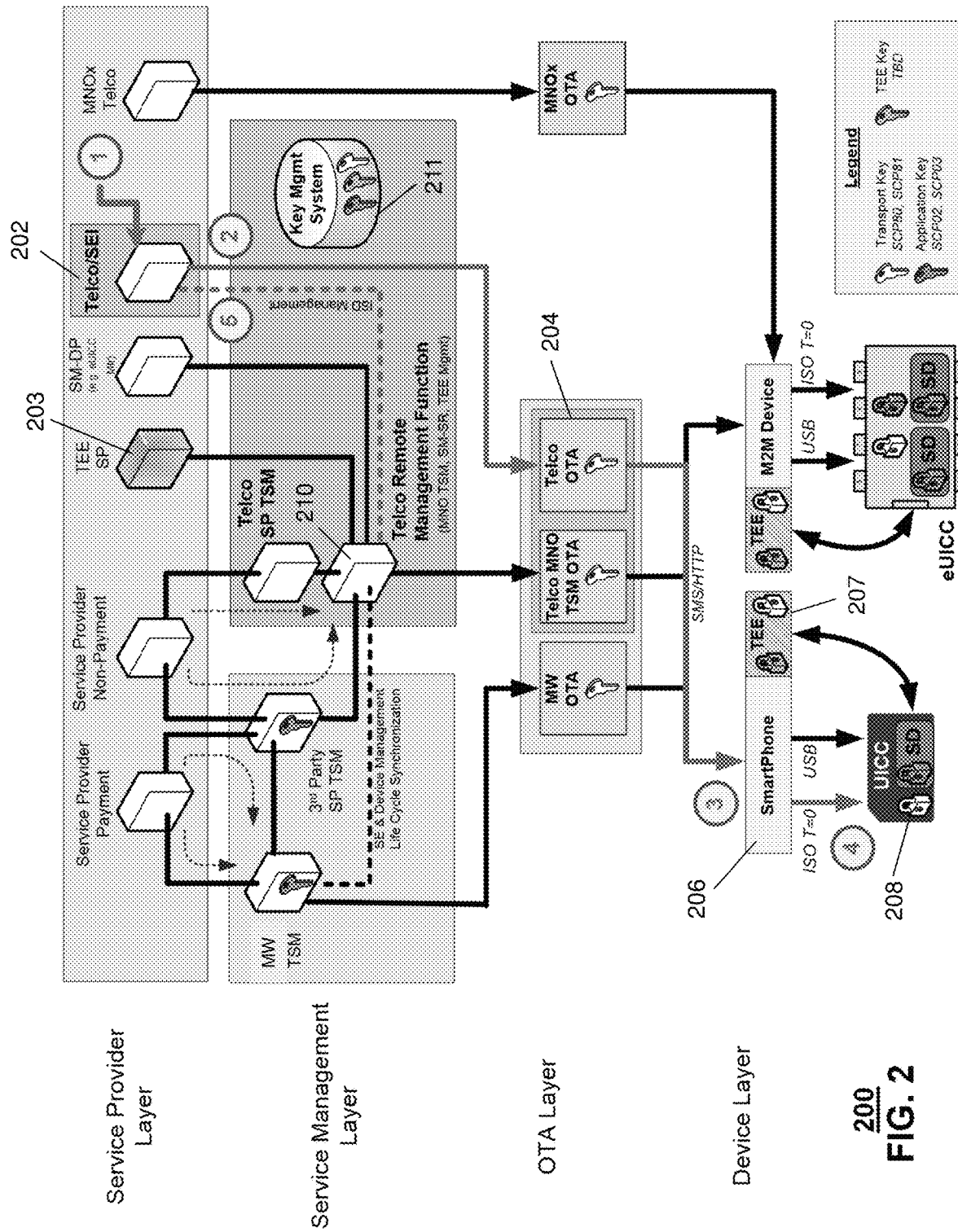
FIG. 2 is an illustrative embodiments of a telecommunication network.

FIG. 1 depicts an illustrative embodiment of a first method used by a telecommunications network 200 shown in FIG. 2. The telecommunications network 200 can comprise four communication layers: 1) a service provider layer, 2) a service management layer, 3) an over-the-air (OTA) layer, and 4) a device layer. The service provider layer can comprise a number of systems such as a service provider payment system, a service provider non-payment system, a trusted execution environment service provider system (TEE SP), a subscription management data preparation system (SM-DP), a Telco secure element issuer system (Telco SEI), and a mobile network operator (MNO) Telco.

The service management layer can comprise a mobile wallet trusted service manager system (MW TSM), a third party service provider TSM, and a Telco remote management function system. The Telco remote management function system can integrate an MNO TSM system, a subscription management secure routing system (SM-SR) system, and a TEE management system. The OTA layer can comprise a mobile wallet (MW) OTA, a Telco MNO TSM OTA, and a legacy Telco OTA. The device layer can comprise a communication device 206 using a UICC 208. In one embodiment, the UICC 208 can be removable from the communication device 206. The encryption keys referred to in FIGS. 2, 4 and 6, which will be described further below, particularly, the transport key, application key, and the TEE key are managed and stored by a key management system 211 shown in FIGS. 2, 4 and 6. Other encryption keys not mentioned in the subject disclosure, but applicable to the subject disclosure, can also be stored and managed by the key management system 211. The encryption keys described in the subject disclosure can be used for encryption as well as authentication purposes.

In an alternate embodiment, the UICC can be embedded in (i.e., not readily removable from) the communication device 206. An embedded UICC may be referred to in the subject disclosure as an eUICC. The communication device 206 can be a portable communication device such as a cellular telephone. In another embodiment, the communication device 206 can be affixed to a structure, a building, an automobile, a meter, or other suitable devices that may or may not be transitory. In this latter embodiment, the communication device 206 can provide a service center telemetry information, and/or enable the service center to control aspects of the device it is affixed to.

The TEE referenced above is defined by a standards organization known as a Global Platform. It is recognized by the Global Platform that modern devices, such as a smartphone, offer a Rich Execution Environment (REE), providing an extensive and versatile operating environment. This brings flexibility and capability, but at the same time leaves the device vulnerable to a wide range of security threats. The TEE can be designed to reside alongside the REE and provide a safe area of the device to protect assets and execute trusted code. A TEE can be an execution environment that runs alongside but isolated from an REE. The TEE has security capabilities and meets certain security-related requirements such as protecting TEE assets from general software attacks, defining rigid safeguards as to data and functions that a program can access, and resisting a set of defined threats. There are multiple technologies that can be used to implement a TEE, and the level of security achieved varies accordingly.

The TSM referenced above is also defined by the Global Platform standards organization. It is recognized by the Global Platform that the TSM can be a trusted third party, which provides one or more technical roles and possibly business roles to other actors in a telecommunications environment. A TSM is trusted by the other actors to be in charge of service management and delivery. The TSM acts as an aggregator and may simultaneously support several service providers and mobile network operators while maintaining confidentiality between the actors.

The MNO TSM referenced above is not defined by the Global Platform standards organization, but is widely referred to in the industry. The MNO TSM implements one or more aspects of SDM (Security Domain Management) as defined by Global Platform on behalf of an MNO (Mobile Network Operator). The SP TSM referenced above is also not defined by the Global Platform standards organization, but is widely referred to in the industry. The SP TSM implements one or more aspects of SDM (Security Domain Management) as defined by Global Platform on behalf of a SP (Service Provider).

A secure element (SE) is also a term defined by the Global Platform standards organization. It is recognized by the Global Platform that the SE is a component in a communication device providing the security and confidentiality required to support various business models. An SE can exist in any form factor such as a UICC, an Embedded SE, a Secure Memory Card, etc.

The SEI referenced above is also defined by the Global Platform standards organization. It is recognized by the Global Platform that the SEI role holds the ultimate responsibility for the Global Platform card. It has the responsibility to develop the card product profile, to choose the platform and application technologies to a design card layout. It usually holds a particular Security Domain in the SE, the Issuer Security Domain (ISD). Card Content Management (CCM) operations that can be performed on the ISD are associated to the Security Domain Manager role that an SE provider may also play.

A security domain (SD) is also a term defined by the Global Platform standards organization. It is recognized by the Global Platform that SD's act as the on-card representatives of off-card authorities. There are three main types of SD, reflecting the three types of off-card authority recognized by a card:

The Issuer Security Domain is the primary, mandatory on-card representative of the Card Administrator, typically the Card Issuer;
  Supplementary Security Domains are additional, optional on-card representatives of Application Providers or the Card Issuer, or their agents (e.g. service bureaus);
  Controlling Authority Security Domains are a special type of Supplementary Security Domain. A Controlling Authority may exist whose role is to enforce the security policy on all application code loaded to the card. If so, the Controlling Authority also uses this type of Security Domain as its on-card representative. There may be more than one such Security Domain.

The three types of SDs described above are referred to simply as SDs in the subject disclosure. SDs support security services such as key handling, encryption, decryption, digital signature generation and verification for their providers' (Card Issuer, Application Provider or Controlling Authority) applications. Each SD is established on behalf of a Card Issuer, an Application Provider or a Controlling Authority when these off-card entities require the use of keys that are completely isolated from each other.

The SM-SR referenced above is defined by the GSM Association (GSMA). It is recognized by the GSMA that the SM-SR securely performs functions which directly manage the operational and provisioning profiles on the eUICC (and possibly in future specifications promulgated by the GSMA the UICC). The SM-DP referenced above is also defined by the GSMA. It is recognized by the GSMA that the SM-DP prepares operational and provisioning profiles to be securely provisioned on the eUICC (and possibly the UICC), e.g. encryption of a profile.

Figure 4:
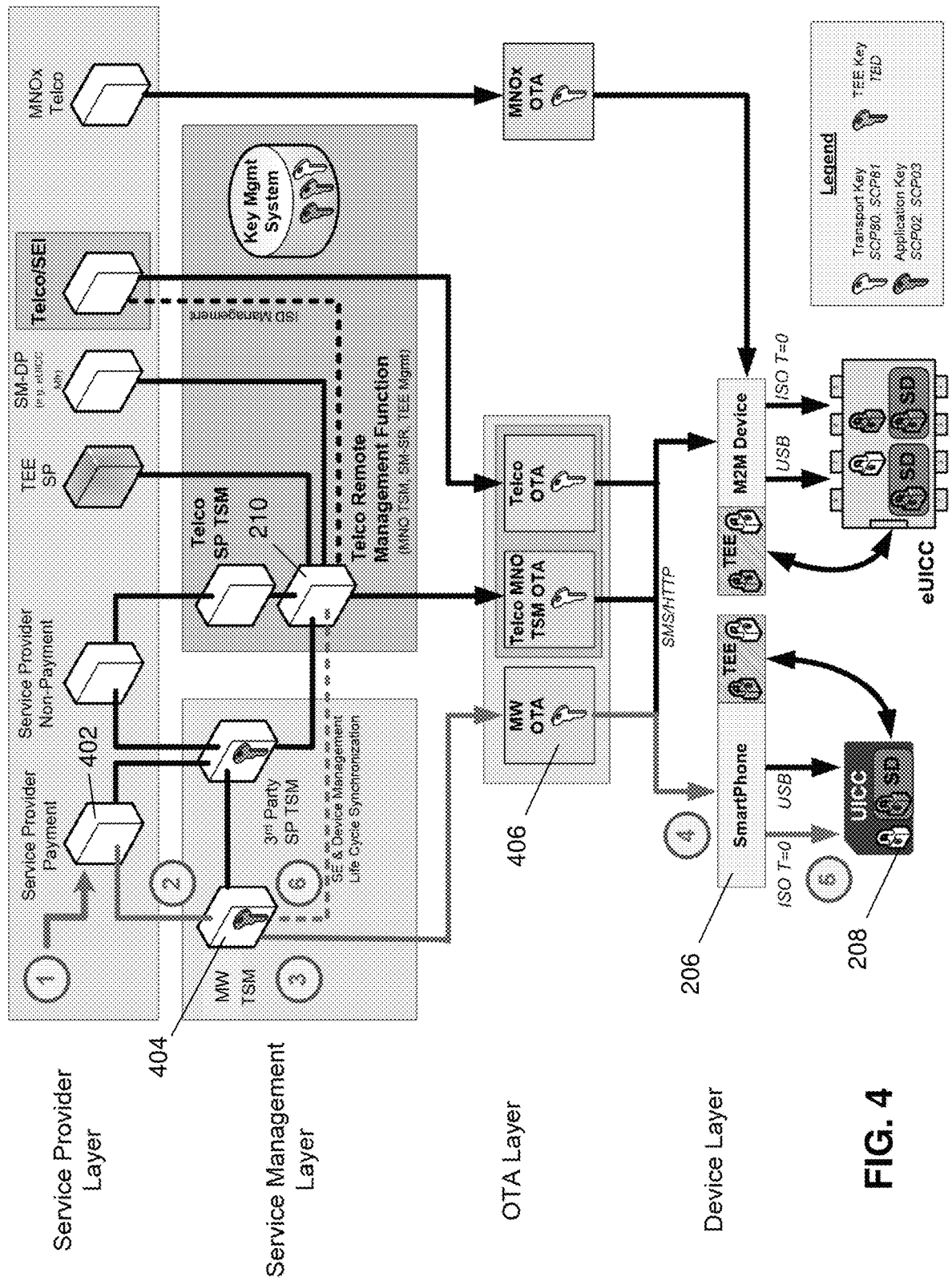
FIG. 4 is an illustrative embodiments of a telecommunication network.
Figure 6:
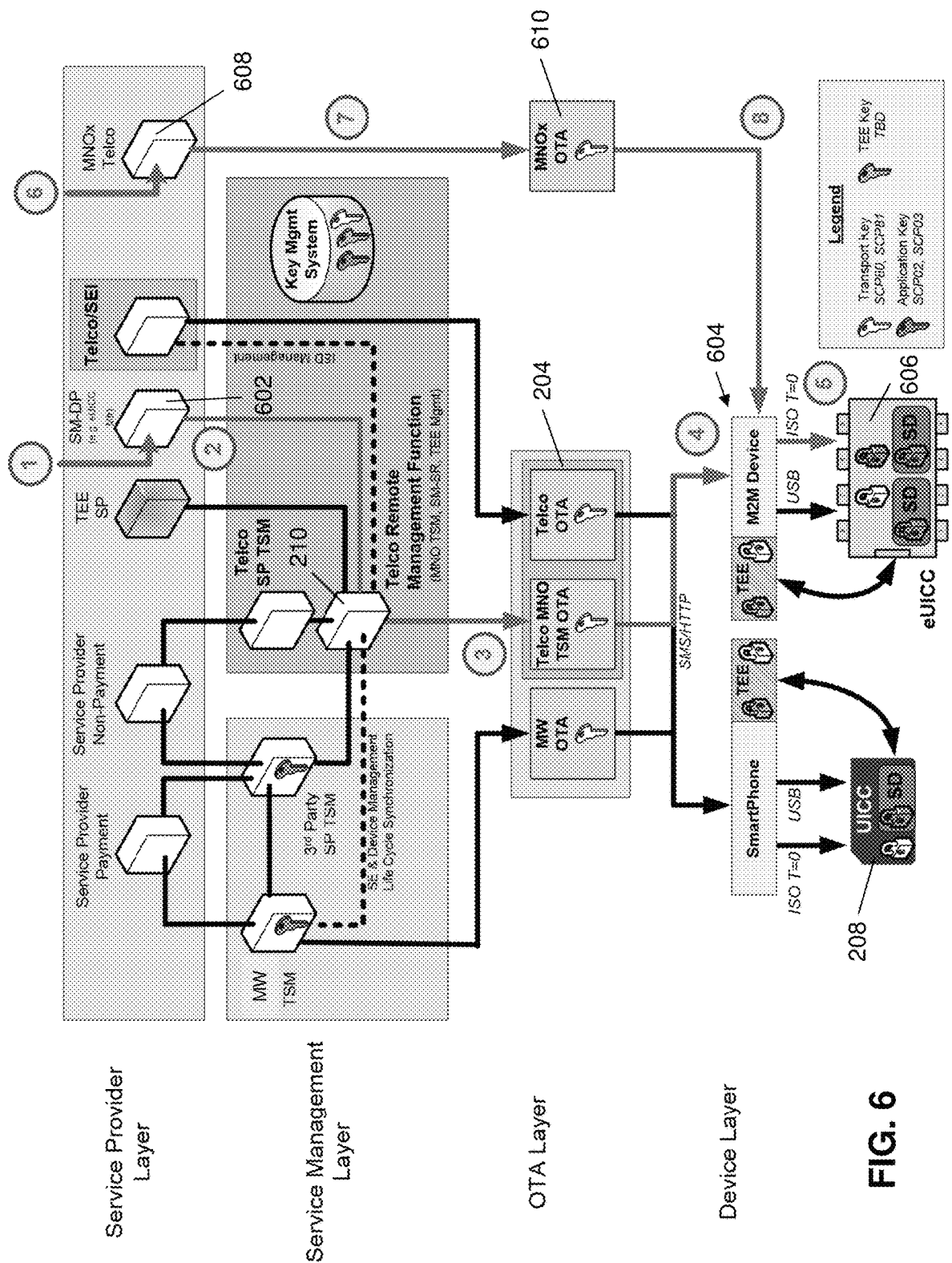
FIG. 6 is an illustrative embodiments of a telecommunication network.

Portions of the systems of FIGS. 2, 4 and 6 can be described in part by standards organizations that generate specifications for consistent application of services. Illustrations of such specifications include, without limitation, Messaging Specification for Management of Mobile-NFC (GPS_SPE_002); TEE System Architecture (GPD_SPE_009); Reprogrammable SIMs: Technology, Evolution and Implications as prepared by OFCOM; Card Specification (GPC_SPE_034), each of the aforementioned specifications and subsequent derivatives being incorporated herein by reference in their entirety.

Referring to FIG. 2, the telecommunications system 200 illustrated therein can be managed in part according to method 100 shown in FIG. 1. Method 100 can begin with step 102 in which a Telco SEI 202 receives a request to modify the UICC 208 of communication device 206. For illustration purposes only, FIGS. 2, 4 and 6 show two types of UICCs (removable and embedded). However, it will be understood in the subject disclosure that methods 100, 300 and 500 of FIGS. 1, 3 and 5, respectively, can be applied to removable or embedded UICCs.

In step 104, the Telco SEI can generate a package including configuration data to modify the UICC 208. The configuration data can comprise one or more authentication keys, one or more network access parameters, one or more service operator applications, or combinations thereof. In one embodiment, the service operator application can be a network-based application that configures the communication device 206 to comply with operational requirements of a communication system from which the communication device 206 receives communication services. The network-based application can be a subscriber identity module (SIM) application, a universal subscriber identity module (USIM) application, or an internet protocol multimedia services identity module (ISIM) application. The UICC executes the SIM application, the USIM application, or the ISIM application depending on whether the network of FIG. 1 operates as a 2G, 3G, LTE or IMS (IP Multimedia Subsystem) network.

At step 106, the Telco SEI can instruct an OTA system 204 to transmit the package. The OTA system 204 can perform this step by generating transport data which is combined with the package provided by the Telco SEI and encrypted with a transport key in step 108. At step 110, the OTA system 204 transmits the encrypted package to the communication device 206. The communication device 206 delivers at step 112 the encrypted package to the UICC 208 which decrypts it with its own transport key. Once decrypted, the UICC 208 provisions itself according to the configuration data. Steps 102-112 can represent a legacy process currently used by existing telecommunications operators to program a UICC.

At step 114, the Telco SEI provides the MNO TSM of the Telco remote management function system 210 information relating to the configuration data to enable the MNO TSM to manage content and memory allocation of the UICC 208. The information provided to the MNO TSM can be any portion of the configuration data useful for managing content and memory of the UICC 208. In step 116, the MNO TSM can use the information provided in step 114 to manage content and memory allocated to SD containers of the UICC 208. The MNO TSM can update content and memory allocation in several ways. For example, it can modify content, remove content, or add content. The MNO TSM can also allocate more or less memory to any of the SD containers, or remove an SD container if necessary. Such updates can occur as needed in step 130.

Independent of the MNO TSM's role, a TEE service provider (SP) 203 can generate a second package encrypted with a TEE key for delivery to the communication device 206. Alternatively, the TEE Management Function 210 can generate the second package encrypted with the TEE key. The second package can include a trusted application to be executed by the communication device 206, which, for example, may have been purchased by the subscriber of the communication device 206. The TEE SP 203 or TEE Management Function 210 can also check that the communication device 206 and UICC 208 are capable of executing the trusted application before the second package is transmitted. This can be accomplished by way of a database lookup to determine available resources of the communication device 206 and UICC 208. The second encrypted package can be further encrypted by the OTA system 204 in step 120 with a transport key, and transmitted to the TEE function 207 of the communication device 206, which may operate outside of the UICC 208. The TEE function 207 can decrypt the second package with the transport key and the TEE key. In step 122, the TEE SP 203 or TEE Management Function 210 can provide the MNO TSM information relating to the transaction (such as the addition of content, details about the content, etc.) to enable the MNO TSM to continue managing content and memory allocation of the UICC.

The MNO TSM discussed in the foregoing embodiments can perform a central function of managing content and memory allocation of the UICC 208. The MNO TSM can serve a role of consolidating all actions of any system whether managed by the same service provider or unaffiliated service providers.

Figure 3:
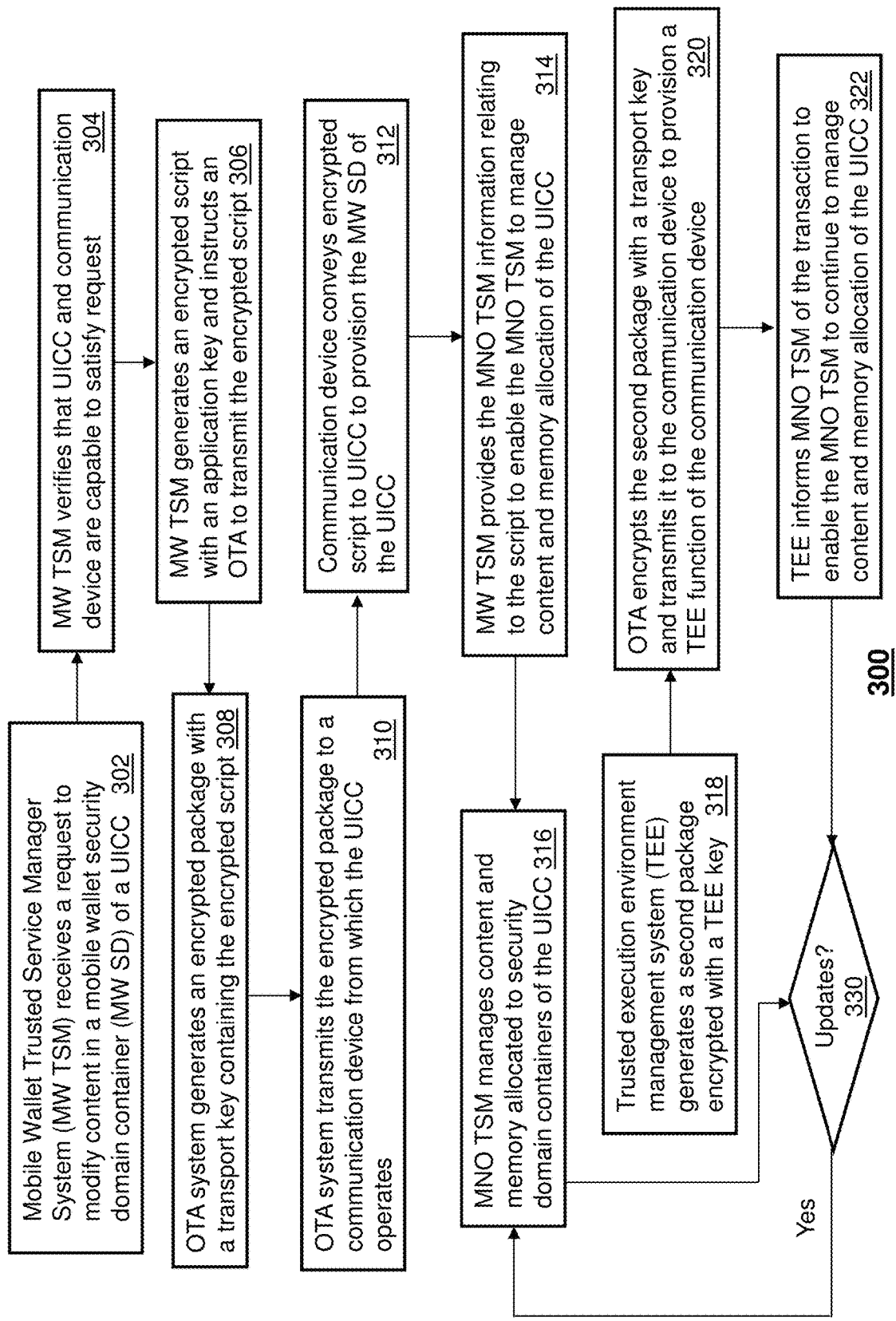
FIG. 3 depicts an illustrative embodiment of a second method.

Referring to the telecommunications system 200 as depicted in FIG. 4, such system 200 can be managed in part according to method 300 shown in FIG. 3. Method 300 can begin with step 302 in which a mobile wallet trusted manager system (MW TSM) 404 receives a request from a service provider payment system 402 to add, remove or update a mobile wallet service of the UICC 208. This step can represent, for example, adding, removing or updating a credit card account service, bank account service, or other suitable payment mechanism of a user, which is managed by way of the UICC 208.

At step 304, the MW TSM 404 can verify that the UICC 208 and the communication device 206 are capable of satisfying the request. In one embodiment, step 304 can represent a validation that the communication device 206 and UICC 208 have the computing resources and encryption technology to perform the requested task. Step 304 can be performed by the MW TSM 404 by retrieving information from a local or remote database that maintains records descriptive of resources available for communication devices and their corresponding UICC's, a log of mobile wallet SD containers in use, and so on. In another embodiment, step 304 can result in the MW TSM 404 communicating with the MNO TSM 210 to inquire about content and memory allocated to the UICC 208 as an additional or alternate validation process for determining whether the request can be satisfied.

Once the MW TSM 404 validates that the communication device 206 and UICC 208 can satisfy the request, the MW TSM 404 proceeds to step 306 where it generates a script encrypted with an application key and instructs an MW OTA system 406 to transmit the encrypted script. At step 308 the MW OTA system 406 generates an encrypted package with the transport key that includes the encrypted script and transport data. The MW OTA system 406 transmits in step 310 the encrypted package to the communication device 206. The communication device 206 then conveys the encrypted script at step 312 to the UICC 208 for processing the mobile wallet script in a mobile wallet SD container.

At step 314 the MW TSM 404 provides the MNO TSM 210 information relating to the script and/or the MW SD container to enable the MNO TSM 210 to further manage content and memory allocation of the UICC 208 at step 316. As in the method of FIG. 1, the MNO TSM 210 manages content and memory of the UICC 208 as updates are detected in step 330. For instance, the MW TSM 404 can be called on to provision the UICC 208 with additional MW SD containers. In this instance, steps 302 through 330 would be invoked, and the MNO TSM 210 at step 330 would be informed of these updates, and would use the additional information provided by the MW TSM 404 to continue to management memory and content of the UICC 208. Additionally, updates to the communication device 206 can also occur which can cause additional updates to be conveyed to the MNO TSM 210. For example, if a new trusted application is generated by the TEE SP 203 or TEE Management Function 210 causing the execution of steps 318 through 322, the MNO TSM 210 detects the update in step 330 and updates its records to continue managing content and memory allocated to the SD containers of the UICC 208. As before, the MNO TSM 210 can be a central authority for managing content and memory allocated to the UICC 208 (and in some instances the communication device 206) as third party providers make updates to the UICC 208 (or the communication device 206). The MNO TSM 210 can at all add or reduce memory allocated to any of the SD containers and/or remove SD containers if necessary to maintain a balanced use of resources of the UICC 208.

Figure 5:
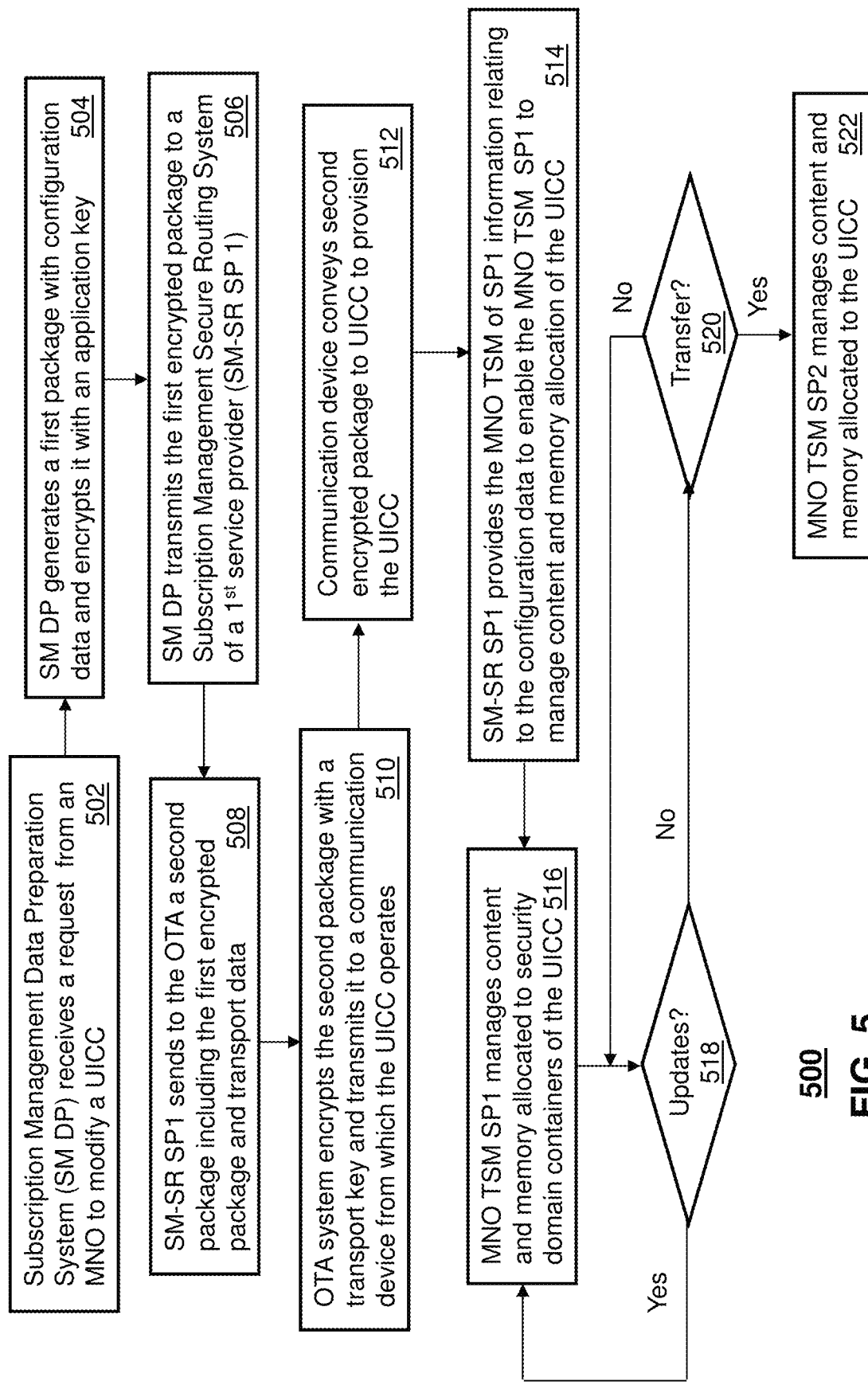
FIG. 5 depicts an illustrative embodiment of a third method.

Referring to the telecommunications system 200 as depicted in FIG. 6, such system 200 can further be managed in part according to method 500 shown in FIG. 5. Method 500 can begin with step 502 where the SM DP 602 receives a request from an MNO 608 to modify a UICC 604. This step can represent a transfer of service from one MNO to another MNO, or the instantiation of new service with an MNO for a communication device that has yet to be brought into service. At step 504 the SM DP 602 generates a first package with configuration data to satisfy the request generated by the MNO 608. The first package is encrypted by the SM DP 602 with an application key. In step 506, the SM DP 602 transmits the first encrypted package to an SM-SR system of a first service provider (SM-SR SP1) 210. The SM-SR SP 1 210 sends the OTA system of the same service provider (OTA SP1) 204 a second package including the first encrypted package and transport data. At step 510, the OTA SP1 204 encrypts the second package with a transport key and transmits it to communication device 604 for provisioning the UICC 606. Although the communication device 604 is shown to use an embedded UICC, method 500 is also applicable to removable UICCs. The communication device 604 then delivers at step 512 the second encrypted package to the UICC 606, which it decrypts with the transport and application keys for provisioning the UICC 606. At step 514, the SM-SR SP1 210 provides the MNO TSM of the same service provider (MNO TSM SP1) 210 information relating to the configuration data used to provision the UICC 606 to enable in step 516 the MNO TSM SP1 210 to manage content and memory allocation of the UICC 606.

It should be noted that SM-SR SP1 210 and the MNO TSM SP1 210 can be integrated in a common system such as the remote management function system 210 of the first service provider. Similarly, the TEE management system of the first service provider (TEE SP1) can also be integrated in the remote management function system 210. The remote management function system 210 can comprise a number of servers operating cooperatively and managed exclusively by the first service provider.

Referring back to FIG. 5, as UICC updates occur, the MNO TSM SP1 210 is informed at step 518 of such updates to continuing manage content and memory allocated to the UICC 606. As before the MNO TSM SP1 210 can increase or decrease memory allocated to SD containers of the UICC 606 or remove one or more SD containers.

Once the UICC 606 has been provisioned at step 512, the MNO system 608 of the other service provider can further provision the UICC 606 by way of an MNO OTA system 610 of the other service provider. In one embodiment, the first service provider may have arrangements with other service providers to delegate management of UICC's when subscribers switch MNO's. If the first service provider determines at step 520 that a subscriber has switched to another service provider, which has a pre-arrangement with the first service provider, then the MNO TSM SP1 210 can delegate content and memory management of the UICC 606 to an MNO TSM of the other service provider (MNO TSM SP2), not shown in FIG. 6. The delegation can be performed by the MNO TSM SP1 210 transmitting to the MNO TSM SP2 sufficient information to enable the MNO TSM SP2 to manage content and memory of the UICC 606 from where the MNO TSM SP1 210 left off. Once the transfer is complete, the MNO TSM SP2 can begin managing content and memory allocated to the UICC 606. Delegation between MNO TSM's of managing content and memory of UICC's can be performed multiple times subscribers switch between MNO's.

Figure 7:
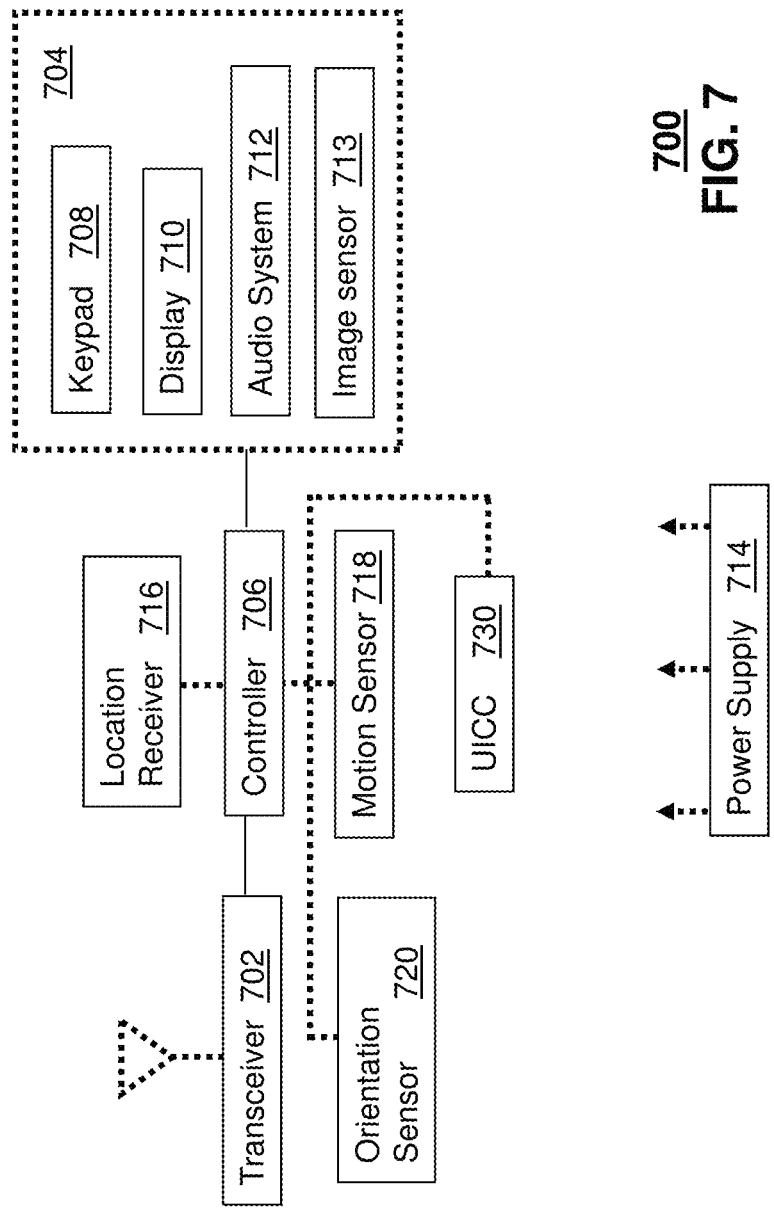
FIG. 7 depicts an illustrative embodiment of a communication device that embodies in whole or in part devices of FIGS. 2, 4 and 6.

FIG. 7 depicts an illustrative embodiment of a communication device 700. Communication device 700 can be in whole or in part an illustrative embodiment of the devices depicted in FIGS. 2, 4 and 6. The communication device 700 can be configured with the features described in methods 100, 300 or 600.

To perform the above features, each of the one or more instances of the communication device 700 can comprise a wireline and/or wireless transceiver 702 (herein transceiver 702), a user interface (UI) 704, a power supply 714, a location receiver 716, a motion sensor 718, an orientation sensor 720, a universal integrated circuit card (UICC) 730, and a controller 706 for managing operations thereof. The transceiver 702 can support short-range (e.g., WiFi or Near Field Communications-NFC) or long-range wireless access technologies such as cellular communication technologies including, for example, CDMA-1X, UMTS/HSDPA, GSM/

GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, IP Multimedia Subsystem, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics). The UICC 730 can be a removable UICC or embedded UICC. The UICC 730 can have its own computing resources such as a microprocessor, memory and an input-output communication interface enabling it to be communicatively coupled to the controller 706 of the communication device. The UICC can execute a subscriber identity module application, a universal subscriber identity module, or an internet protocol multimedia services identity module application for managing communications between the communication device 700 and wireless base stations of a cellular communications network.

In a first one embodiment, one or more instances of the communication device 700 can be configured for receiving a request to modify a universal integrated circuit card, generating a package comprising configuration data for modifying the universal integrated circuit card, encrypting the package with a transport key to generate an encrypted package, and transmitting the encrypted package to a device communicatively coupled to the universal integrated circuit card to provision the universal integrated circuit card. The one or more instances of the communication device 700 can also be configured for sharing the configuration data to enable a mobile network operator trusted service manager system to manage content and memory allocation of the universal integrated circuit card.

In a second embodiment, one or more instances of the communication device 700 can be configured for receiving a request to modify content in a mobile wallet security domain container of a universal integrated circuit card, verifying that resources of the universal integrated circuit card and a device communicatively coupled to the universal integrated circuit card are capable of satisfying the request, and generating a script according to the request. The one or more instances of the communication device 700 can also be configured for encrypting the script according to an application key to generate an encrypted script, instructing an over-the-air system to transmit the encrypted script, generating a package comprising the encrypted script and transport data, encrypting the package with a transport key to generate an encrypted package, and transmitting the encrypted package to the device communicatively coupled to the universal integrated circuit card to provision the content of the mobile wallet security domain container of the universal integrated circuit card. The one or more instances of the communication device 700 can further be configured for providing a mobile network operator trusted service manager system information relating to the provisioning of the mobile wallet security domain to manage content and memory allocation of the universal integrated circuit card.

In a third embodiment, one or more instances of the communication device 700 can be configured for receiving a first encrypted package, where the first encrypted package is encrypted by a subscription management data preparation system with an application key responsive to the subscription management data profile system receiving a request from a second service provider to modify a universal integrated circuit card with configuration data. The one or more instances of the communication device 700 can also be configured for sending to an over-the-air system of the first service provider a second package comprising the first encrypted package and transport data, encrypting the second package with a transport key to generate an encrypted second package, and transmitting the encrypted second package to a device communicatively coupled to the universal integrated circuit card to provision the universal integrated circuit card with the configuration data. The one or more instances of the communication device 700 can further be configured for providing a mobile network operator system of the first service provider information relating to the configuration data to enable the mobile network operator trusted service manager system of the first operator to manage content and memory allocation of the universal integrated circuit card.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
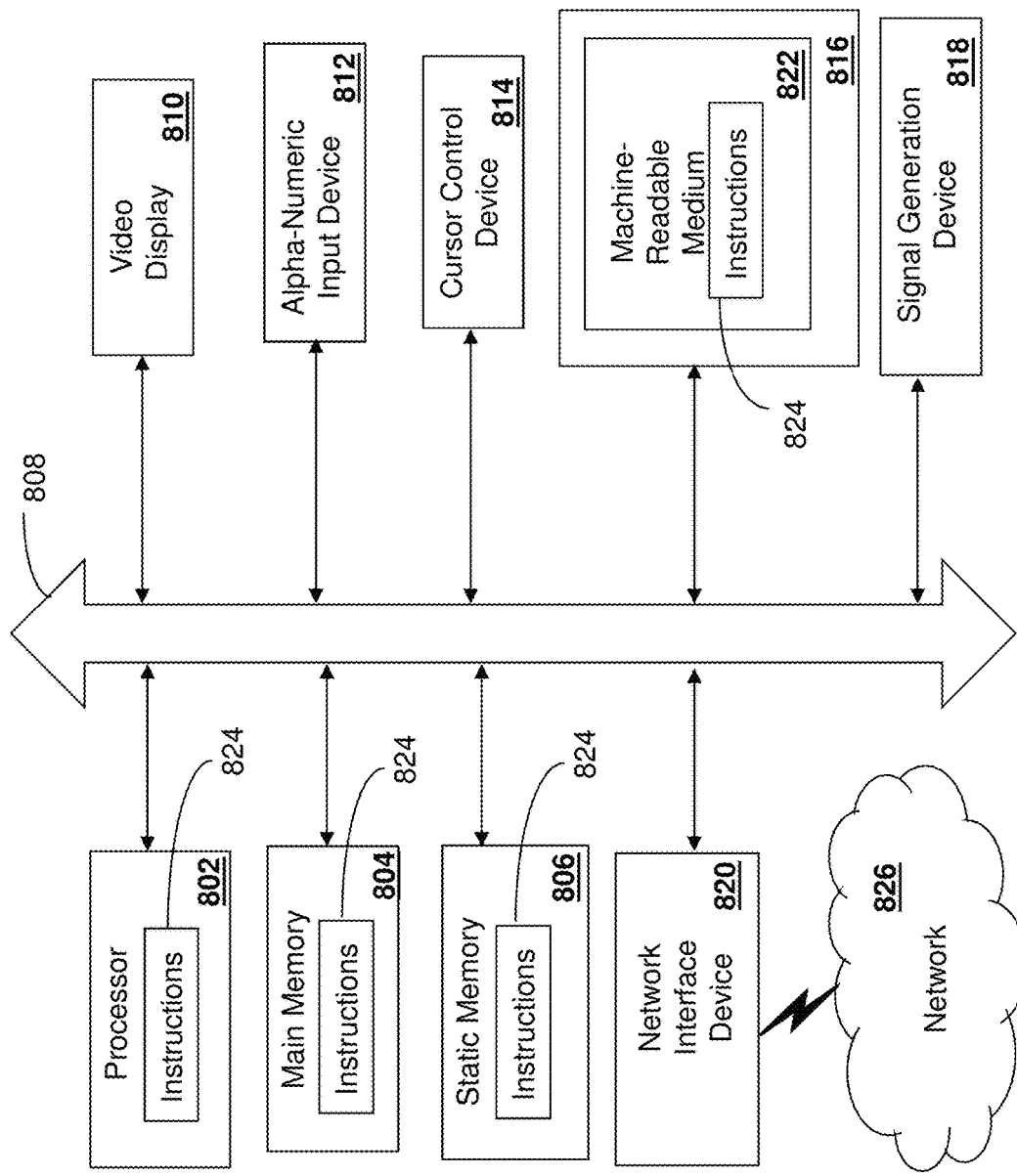
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the devices shown in FIGS. 2, 4, and 6. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee, or Near Field Communications or NFC), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
providing a first mobile network operator trusted manager service system of a first mobile network operator with information relating to configuration data to enable the first mobile network operator trusted service manager system to manage content and memory allocation for a plurality of security domain containers of a universal integrated circuit card of a communication device;
detecting that the communication device is to be provided services by a second mobile network operator; and
responsive to determining that there is a pre-arrangement between the first mobile network operator and the second mobile network operator, delegating security management of the universal integrated circuit card of the communication device by providing a second mobile network operator trusted service manager system of the second mobile network operator with the information relating to the configuration data to enable the second mobile network operator trusted service manager system to manage the content and the memory allocation for the plurality of security domain containers of the universal integrated circuit card of the communication device,
wherein the second mobile network operator trusted service manager determines a first group of services provided to the communication device by the first mobile network operator and determines a second group of services provided to the communication device by the second mobile network operator, wherein the second mobile network operator trusted service manager adjusts the memory allocation for the plurality of security domain containers according to the second group of services.

2. The device of claim 1, wherein the operations further comprise instructing an over-the-air system to transmit a first package that comprises configuration data for modifying the universal integrated circuit card.

3. The device of claim 2, wherein the instructing causes the over-the-air system to encrypt the first package with a transport key to generate a first encrypted package.

4. The device of claim 3, wherein the instructing causes the over-the-air system to transmit the first encrypted package to the communication device communicatively coupled to the universal integrated circuit card to provision the universal integrated circuit card.

5. The device of claim 1, wherein the providing the information to the first mobile network operator trusted service manager system is based on monitoring for configuration changes at the universal integrated circuit card and occurs in response to and after a detection of a particular configuration change at the universal integrated circuit card.

6. The device of claim 5, wherein the particular configuration change is based on the configuration data of a first package, wherein the communication device and the first mobile network operator trusted service manager system are separate devices, wherein the first mobile network operator trusted service manager system is remotely located from the communication device.

7. The device of claim 5, wherein management of the content and the memory allocation for the plurality of security domain containers includes changing an amount of memory resource allocated to a particular security domain container of the plurality of security domain containers, wherein the plurality of security domain containers comprises an issuer security domain, a supplementary security domain, and a controlling authority security domain, wherein the issuer security domain stores first content that includes card issuer content, wherein the supplementary security domain stores second content that includes application provider content, and wherein the controlling authority security domain stores third content that includes security policy content.

8. A non-transitory, machine-readable storage medium, comprising executable instructions that, when executed by a processing system including a processor, facilitate performance of operations, the comprising:
providing a first mobile network operator trusted manager service system of a first mobile network operator with information relating to configuration data to enable the first mobile network operator trusted service manager system to manage content and memory allocation for a plurality of security domain containers of a universal integrated circuit card of a communication device; and
responsive to determining that there is a pre-arrangement between the first mobile network operator and a second mobile network operator, delegating security management of the universal integrated circuit card of the communication device in response to detecting that the communication device is to be provided services by the second mobile network operator by providing a second mobile network operator trusted service manager system of the second mobile network operator with the information relating to the configuration data to enable the second mobile network operator trusted service manager system to manage the content and the memory allocation for the plurality of security domain containers of the universal integrated circuit card of the communication device, wherein the providing the information to the first mobile network operator trusted service manager system is based on monitoring for configuration changes at the universal integrated circuit card and occurs in response to and after a detection of a particular configuration change at the universal integrated circuit card,
wherein the second mobile network operator trusted service manager determines a first group of services provided to the communication device by the first mobile network operator and determines a second group of services provided to the communication device by the second mobile network operator, wherein the second mobile network operator trusted service manager adjusts the memory allocation for the plurality of security domain containers according to the second group of services.

9. The non-transitory, machine-readable storage medium of claim 8, wherein the operations further comprise instructing an over-the-air system to transmit a first package that comprises configuration data for modifying the universal integrated circuit card.

10. The non-transitory, machine-readable storage medium of claim 9, wherein the instructing causes the over-the-air system to encrypt the first package with a transport key to generate a first encrypted package.

11. The non-transitory, machine-readable storage medium of claim 10, wherein the instructing causes the over-the-air system to transmit the first encrypted package to the communication device communicatively coupled to the universal integrated circuit card to provision the universal integrated circuit card.

12. The non-transitory, machine-readable storage medium of claim 8, wherein the particular configuration change is based on the configuration data of a first package, wherein the communication device and the first mobile network operator trusted service manager system are separate devices, wherein the first mobile network operator trusted service manager system is remotely located from the communication device.

13. The non-transitory, machine-readable storage medium of claim 8, wherein management of the content and the memory allocation for the plurality of security domain containers includes changing an amount of memory resource allocated to a particular security domain container of the plurality of security domain containers, wherein the plurality of security domain containers comprises an issuer security domain, a supplementary security domain, and a controlling authority security domain, wherein the issuer security domain stores first content that includes card issuer content, wherein the supplementary security domain stores second content that includes application provider content, and wherein the controlling authority security domain stores third content that includes security policy content.

14. A method, comprising:
instructing, by processing system of a secure element issuer system including a processor, an over-the-air system to transmit a first package that comprises configuration data for modifying a universal integrated circuit card;
providing, by the processing system of the secure element issuer system, a first mobile network operator trusted manager service system of a first mobile network operator with information relating to configuration data to enable the first mobile network operator trusted service manager system to manage content and memory allocation for a plurality of security domain containers of the universal integrated circuit card of a communication device;
detecting, by the processing system of the secure element issuer system, that the communication device is to be provided services by a second mobile network operator; and
responsive to determining that there is a pre-arrangement between the first mobile network operator and the second mobile network operator, delegating, by the processing system of the secure element issuer system, security management of the universal integrated circuit card of the communication device by providing a second mobile network operator trusted service manager system of the second mobile network operator with the information relating to the configuration data to enable the second mobile network operator trusted service manager system to manage the content and the memory allocation for the plurality of security domain containers of the universal integrated circuit card of the communication device,
wherein the second mobile network operator trusted service manager determines a first group of services provided to the communication device by the first mobile network operator and determines a second group of services provided to the communication device by the second mobile network operator, wherein the second mobile network operator trusted service manager adjusts the memory allocation for the plurality of security domain containers according to the second group of services.

15. The method of claim 14, wherein the instructing causes the over-the-air system to encrypt the first package with a transport key to generate a first encrypted package.

16. The method of claim 15, wherein the instructing causes the over-the-air system to transmit the first encrypted package to the communication device communicatively coupled to the universal integrated circuit card to provision the universal integrated circuit card.

17. The method of claim 14, wherein the providing the information to the first mobile network operator trusted service manager system is based on monitoring for configuration changes at the universal integrated circuit card and occurs in response to and after a detection of a particular configuration change at the universal integrated circuit card.

18. The method of claim 17, wherein the particular configuration change is based on the configuration data of the first package, wherein the communication device and the first mobile network operator trusted service manager system are separate devices, wherein the first mobile network operator trusted service manager system is remotely located from the communication device.

19. The method of claim 17, wherein management of the content and the memory allocation for the plurality of security domain containers includes changing an amount of memory resource allocated to a particular security domain container of the plurality of security domain containers, wherein the plurality of security domain containers comprises an issuer security domain, a supplementary security domain, and a controlling authority security domain.

20. The method of claim 19, wherein the issuer security domain stores first content that includes card issuer content, wherein the supplementary security domain stores second content that includes application provider content, and wherein the controlling authority security domain stores third content that includes security policy content.

* * * * *